(12) United States Patent
Balthazar

(10) Patent No.: US 9,882,382 B2
(45) Date of Patent: Jan. 30, 2018

(54) POWER MONITORING MASTER LOAD STRIP WITH TRIPLE SLAVE LOADS

(71) Applicant: Michel Balthazar, St-Calixte (CA)

(72) Inventor: Michel Balthazar, St-Calixte (CA)

( * ) Notice: Subject to any disclaimer, the term of this patent is extended or adjusted under 35 U.S.C. 154(b) by 745 days.

(21) Appl. No.: 14/193,225

(22) Filed: Feb. 28, 2014

(65) Prior Publication Data
US 2015/0001935 A1 Jan. 1, 2015

(30) Foreign Application Priority Data
Mar. 25, 2013 (CA) .................................... 2811097

(51) Int. Cl.
*H02J 3/14* (2006.01)
*H02J 3/00* (2006.01)
*H02J 9/00* (2006.01)
*G06F 1/26* (2006.01)
*H02J 7/00* (2006.01)
*H01R 24/68* (2011.01)
*H01R 25/00* (2006.01)
*H01R 31/06* (2006.01)

(52) U.S. Cl.
CPC ................ *H02J 3/00* (2013.01); *G06F 1/266* (2013.01); *H02J 3/14* (2013.01); *H02J 7/0024* (2013.01); *H02J 7/0054* (2013.01); *H02J 7/0055* (2013.01); *H02J 9/005* (2013.01); *H01R 24/68* (2013.01); *H01R 25/006* (2013.01); *H01R 31/065* (2013.01); *Y10T 307/469* (2015.04)

(58) Field of Classification Search
CPC ... G05F 1/12; H02J 3/00; H02J 7/0054; H02J 7/0055; H02J 3/14; H02J 9/005; H02J 7/0024; H01R 13/6675; H01R 13/6683; G06F 1/266
USPC ........ 307/40, 31, 18, 39, 131; 361/115, 118; 340/654, 870.02
See application file for complete search history.

(56) References Cited

U.S. PATENT DOCUMENTS

| | | | | |
|---|---|---|---|---|
| 5,424,903 | A * | 6/1995 | Schreiber | G06F 1/266 307/40 |
| 7,358,625 | B2 * | 4/2008 | Cheng | H01R 13/6675 307/18 |
| 2009/0102294 | A1 * | 4/2009 | Hodges | H02H 3/12 307/126 |

(Continued)

*Primary Examiner* — Arnold Kinkead
(74) *Attorney, Agent, or Firm* — Carter, DeLuca, Farrell & Schmidt, LLP

(57) ABSTRACT

A horizontal electrical power strip device including a built in power plug, one master power outlet and triple slave power outlets controlled independently and simultaneously from each other through a master outlet. A power-sensing device (relay element) is coupled to a switch that allows the slave power outlets to be automatically turned on or off (controlled by the master outlet drawing sufficient current) and having different states simultaneously. Thus when current is being drawn from the master outlet the first slave is switched to an on (closed circuit) state, the second slave is switched to an off (open circuit) state while the third slave stays uninterrupted in an indefinite on (closed circuit) state. Having both simultaneously similar and opposite states of that to the master, the slave outlets offer a wide range of uses from power tools to home appliances including sharing of the same electrical power circuit.

20 Claims, 2 Drawing Sheets

(56) References Cited

U.S. PATENT DOCUMENTS

2010/0141040 A1\* 6/2010 Chapel ............... H01R 13/6683
  307/80
2015/0261231 A1\* 9/2015 Jiang ........................ G05F 1/12
  307/31

\* cited by examiner

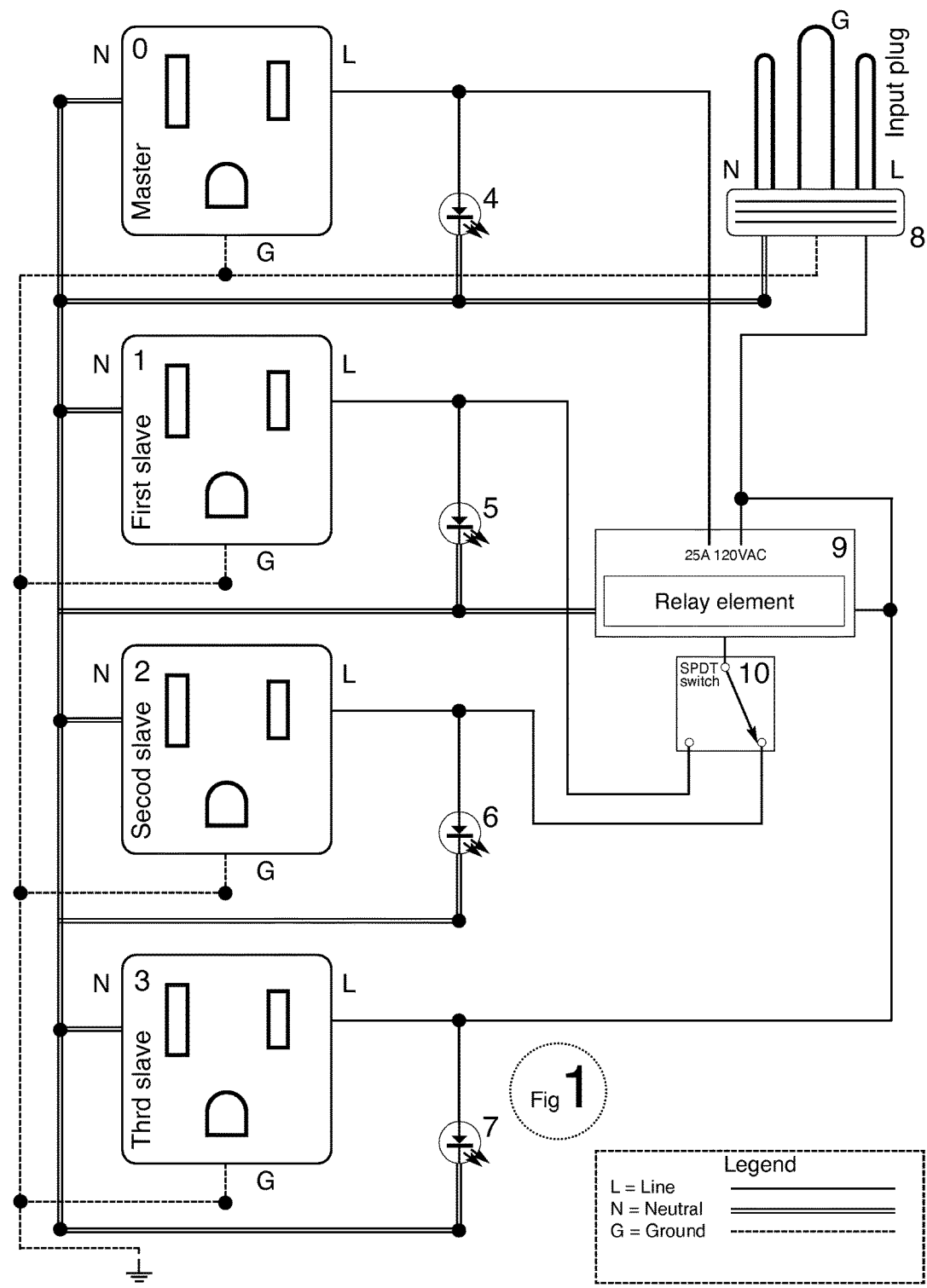

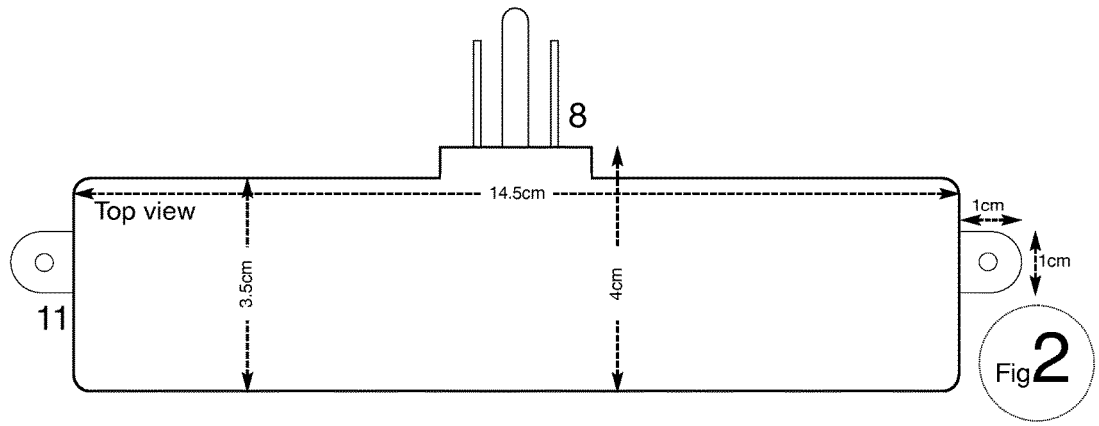
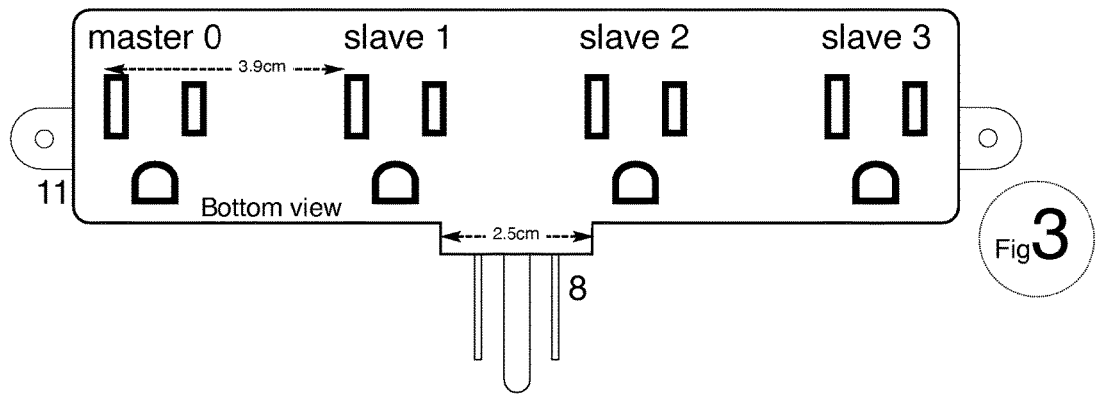
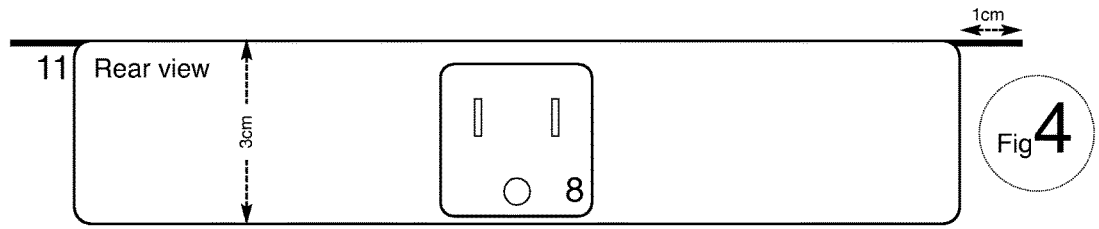
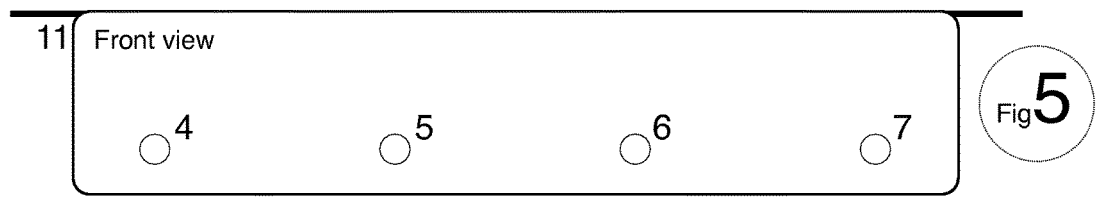
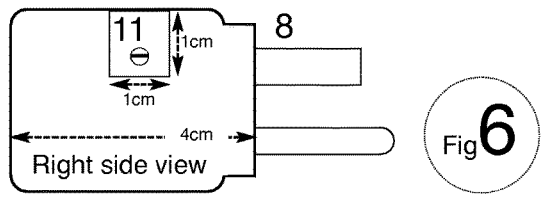
Legend
Scale: 1 cm to 1 cm = 100%
N.B. When the same number appears in different figures it represent the same part.

POWER MONITORING MASTER LOAD STRIP WITH TRIPLE SLAVE LOADS

FIELD OF THE INVENTION

The present invention relates to a horizontal electrical power strip device, and more particularly, to a horizontal electrical power strip device that can be used in conjunction with power tools so as to allow secondary tools associated with a master tool to be automatically turned on or off simultaneously with the master tool being turned on or off, as well as simultaneously cutting off power to a third group of tools associated with the same master tool and furthermore with the possibility of continually supplying uninterrupted power to a fourth group of tools.

The present invention also relates to a horizontal electrical power strip device that can be used in conjunction with, electrical and or electronic appliances, accessories and equipment in homes, offices, laboratories, construction sites and more, that when two or more appliances, accessories and or equipment are used simultaneously on a single 120 volts, 15 amp to 25 amp electrical circuit, and that without the use of power sharing by the horizontal electrical power strip device, would otherwise overload that circuit.

BACKGROUND OF INVENTION

In the past, power bars (power strips) either came with no overload protection or some overload protection. In some instances the auto overload protection must be manually reset, in other instances it will reset over a pre-set amount of time or when a normalized internal temperature is reached. No matter which of the above situations the common result is, an automatic cutoff or shut down of power to some or all of the outlets. This until power is finally reset. Resulting in total or partial stopping of production (use of electrical power) for a pre-set or indefinite amount of time. In the case where there is no protection on the power strip the circuit fuse or breaker will (when overloaded) cut power until the fuse is replaced or breaker tripped back on.

More over most power bars cannot withstand more than 15 amps strain on either one of or the totality of their outlets. In some cases controlled power bars will compensate by shutting down one or more of the slave outlets to prevent a possible overload at or near 15 amps, and in other cases the power bar will shut down completely. Once again resulting in a shutdown of power and alternately the stopping of production.

Many power bars also come with surge protection for phone lines and computer communications LAN (local area network) protection.

Although these features may be useful in particular instances they do little or nothing to address and remedy the basic underling situations we wish to expose here.

The first example explaining the need for this new horizontal electrical power strip device will be one where, we feel primarily the construction and renovation industry is concerned. This example uses the full potential of all of the four different outlets simultaneously. It is understood in this example, like in most construction and renovation situations that only one extension cord, plugged into one 20-amp circuit is readily available.

A worker must use an electric tool (in this case a miter saw) thus creating dust. To remedy the dust situation he must use an electric vacuum cleaner with its suction hose connected directly to the saw's dust exhaust output. Concentrating on his work (measurements prior to the cut), the said worker forgets to start the vacuum before making a cut. Two problems occur, first dust flies everywhere and second the suction hose tends to block because of the absence of suction. By plugging the miter saw in the master outlet (0) of the horizontal electrical power strip device and by plugging the vacuum into the first slave outlet (1) of the power strip, the vacuum will start simultaneously with the saw (i.e. the saw controls the vacuum). Not only does this remedy the problem of the worker forgetting to start the vacuum, it also saves on electrical power because the vacuum stays on only for the exact duration of the cut (saw). Moreover, not having to use the switch on the vacuum by leaving it in the on position, the worker can proceed to placing the vacuum further away from his immediate work space (i.e., behind the miter saw), providing him with a larger, safer and more productive environment.

The second part of this first example concurs with the former, to which we shall add a portable air compressor. The compressor shall be used to provide air for a tool (in this case a nailer). Air compressors automatically shuffle from an on to an off position depending on whether or not the predefined air supply is sufficient or not for the nailer. To prevent the compressor from automatically turning on at the same time as the saw and vacuum, the compressor shall be plugged into the second slave outlet (2). Thus preventing an otherwise overload situation, as we consider the total amount of electrical power needed to supply both the saw, vacuum and compressor together is way above the maximum limit of a 20-amp circuit breaker or fuse.

The third part of this first example concurs with the two former, to which we shall add a utility work light. The light shall be used for example to provide constant uninterrupted light for said worker. For the light to operate without being influenced in any way by any of the above said tools it shall be connected to the third slave outlet (3).

This second example explaining the need for the horizontal electrical power strip device will be one where, we feel primarily the home, office and laboratory is concerned. In this example the first scenario, uses the full potential of all of the four different outlets simultaneously and the following scenarios use different partial to full potential combinations.

In a typical home, office or laboratory kitchen, we often find a refrigerator, microwave oven, electric clock and many other plug-in appliances. In the same spirit as the first example we know for a fact that we cannot use on a same 15-amp standard electrical circuit, a refrigerator simultaneously with a microwave oven, or a toaster with a kettle or even a toaster oven with a coffee machine not to mention a dishwasher with any of the previous appliances. Most new kitchens are fitted with two separate circuits to accommodate for such situations. But with the never-ending additions to our kitchen environments, the basic existing wiring setup does not suffice any more. More and more appliances will have to share a common 15-amp circuit.

Again as in the first tool example, the combinations of uses in the kitchen are almost endless. For the purpose of keeping the text as brief as possible in the following two scenarios one can readily replace just about any appliance by an other.

In a kitchen where certain appliances want to be moved away from one outlet to another so that the counter space becomes a more ergonomic working area, a microwave oven will share a common outlet with a refrigerator and an electric clock. Once the horizontal electrical power strip device is plugged into the wall outlet, we start by plugging the microwave oven into the master outlet (0) and then plug the refrigerator into the second slave outlet (2), only then will neither of them ever function at the same time. To prevent unwanted cutoff of electrical power to the refrigerator, which could happen if the door to the microwave was left open after use (thus commanding the microwave inner light to be left on) causing the refrigerator to stay off, a buzzer or night-light will be plugged into the first slave outlet (1), to alarm the operator of this potential situation. Finally, the clock or timer that needs continuous uninterrupted power is plugged into the third slave (3) outlet.

A second scenario with endless combinations and various partial usages of the horizontal electrical power strip device is demonstrated next.

In a kitchen where a dishwasher is added to existing underlying cabinet space but no electrical outlet is available and the closest alternative being the refrigerator's outlet, one can first unplug the refrigerator from its original outlet, replacing it with the horizontal electrical power strip device. Then proceeding by first plugging the dishwasher into the master outlet (0) and finally plugging the refrigerator into the second slave outlet (2), thus in this example there is no need for the slave outlets (1 and 3).

Moreover each time the dishwasher is running, the refrigerator's electrical power supply is temporarily cut off. Usually a dishwasher cycle is about 50 minutes, thus hardly affecting the set temperature inside the refrigerator. Secondly because the refrigerator is plugged into the second slave outlet (2) the shuffling on and off of the refrigerator during its normal cycle will not affect the dishwasher nor will it interrupt the dishwasher's cycle.

Staying consistent with the above scenario, here are a few other examples. We have replaced the dishwasher previously using the master outlet (0) and the refrigerator previously using the second slave outlet (2)

Example (A) A TV master outlet (0) with an Air conditioner second slave outlet (2) in the same room on the same circuit.

Example (B) A humidifier master outlet (0) with a Heater second slave outlet (2) in the same room on the same circuit.

Example (C) A potable water pump master outlet (0) with a sump pump second slave outlet (2) in a basement on the same circuit. In this example the potable water has priority over the sump pump.

Example (D) A sump pump master outlet (0) with a potable water pump in the second slave outlet (2) and a buzzer as an alarm in first slave outlet (1). In this example the sump pump has priority over the potable water pump but lets the user be warned that the sump pump is running through the use of the buzzer. If desired the buzzer may be extended to another area (room or building level) with an ordinary extension cord.

SUMMARY OF THE INVENTION

The present invention relates to a quadruple horizontal electrical power strip device (FIG. 3) including a built in power plug (8), one master power outlet (0) and triple slave power outlets (1-2-3) controlled independently from each other and simultaneously through the master outlet (0). A power-sensing device, relay element (9) is coupled to a SPDT switch (10) allows the slave power outlets (1-2) to be automatically turned on or off (under the control of the master plug (0) drawing sufficient current) and having different states simultaneously from each other. Thus when sufficient current is being drawn from the master outlet (0) the first slave (1) is switched to an on (closed circuit) state, the second slave (2) is switched to an off (open circuit) state while the third slave (3) stays uninterrupted indefinitely in an on (closed circuit) state. Having both simultaneously similar and opposite states of that to the master (0), the slave outlets (1-2-3) offer a wide range of uses. Four diode lights (4-5-6-7) with different colors and, solid to flashing states, are placed on the front panel adjacent their relative outlets to identify the different changes (if any) in states of electrical power to each of the individual, power outlets (0-1-2-3). The relay element (9) is insensitive (unresponsive) to any changes in power consumption under 10 watts passing through the master outlet (0). This makes it possible to use a tool or appliance with low power consumption during its off state (for example a control panel or LED lighted buttons), in the master outlet (0). In other words as long as the tool or appliance uses less than 10 watts it will not trip the SPDT switch (9). All electrical conductor parts, relay, and switching devices are built to meet a maximum of a 25-amp, 120 volts alternating current resistance so as to withstand tools with heavy electrical consumption. The wiring of all four outlets (0-1-2-3) is grounded and the physical shape of the horizontal electrical power strip device (FIG. 3) is designed so that no grounded plug can be inserted backwards. The physical spacing between all of the outlets (FIG. 3) is 3.9 cm on center, to permit the use of larger commercial plugs to be inserted next to each other in any order, keeping in mind that the exact physical disposition of each plug to be used simultaneously may not be a matter of choice.

DESCRIPTION OF EMBODIMENT

The physical design is also an important aspect of the invention for a number of reasons. Because the total distance from the wall outlet to the most outer part of the power strip body is 4 cm (FIG. 2), the four outlets (0-1-2-3) are installed on the bottom side at a 90 degree angle to its own built in plug (8). This in turn uses up less counter space when plugged to the wall at the back end of a counter. Also it lets the user see the four LED lights (FIG. 5) (4-5-6-7) that face him when all is plugged in during normal and optimal use. On each end of the power strip (FIGS. 2 and 6) are removable metal brackets (11), if desired a permanent installation in front of, behind or under a counter or workbench is made possible by screwing the removable metal brackets (11) to the base material. If the brackets are not needed or are of any inconvenience they may safely be removed from the horizontal electrical power strip device at any time.

Keeping in mind the different environments the power strip will be used in, particular attention must be set to the outer body material. A rubberized plastic material able to withstand temperatures of +40 to −40 degrees centigrade, must completely seal the inner parts to the outer environment including resisting water, saltwater and common petroleum products, i.e., all grades of motor oil, form work oil, liquid tar and basic cleaning solvents. Moreover the sealed body must contain sparking (sparks caused by, i.e., the switch element) of all internal parts and contacts to its internal environment, making it safe to be used near flammable gasses and liquids. Also the outer body material must be able to withstand at least 500 lbs of crush pressure on its total surface area, while keeping all inner parts uncrushed and in good working condition.

BRIEF DESCRIPTION OF SPECIFIC VIEWS
(FIGS. 1 THROUGH 6)

FIG. 1

The electrical layout, showing in detail all of the different inner and outer electrical parts of the invention and how they are connected.

FIG. 2

Top view describing the different measures in centimeters of the physical embodiment, including the removable metal brackets.

FIG. 3

Bottom view describing the different measures in centimeters of the physical placement of each of the receptacles contained in the embodiment.

FIG. 4

Rear view describing the height in centimeters of the physical embodiment, including the length of the removable metal brackets.

FIG. 5

Front view describing the positioning of the four diode lights.

FIG. 6

Right side (end) view describing the positioning of the metal bracket attachment housing and total distance in centimeters the power strip stands out from the wall.

What is claimed is:

1. A power strip device comprising:
a power plug including a line input and a neutral input;
a relay electrically coupled between the line input and the neutral input of the power plug;
a master power outlet including a line output and a neutral output, the line output of the master power outlet being electrically coupled to the line input of the power plug through the relay;
a plurality of slave power outlets each having a neutral output electrically coupled to the neutral input of the power plug, the plurality of slave power outlets including a first slave power outlet, a second slave power outlet, and a third slave power outlet; and
a switch having a switch input and two switch outputs, the switch input being electrically coupled to the relay and the two switch outputs being electrically coupled to the line outputs of the first slave power outlet and the second slave power outlets; and outlet, respectively,
wherein the relay is configured to cause the switch to switch the first slave power outlet to an on state or an off state and to switch the second slave power outlet to a state opposite the state of the first slave power outlet based upon the amount of current being supplied to the master power outlet,
wherein the master power outlet is maintained in an on state so that a first external device electrically connected to the master power outlet can continuously draw current through the relay from the power plug, and when the first external device electrically connected to the master power outlet draws a current greater than a predetermined current level through the relay from the power plug, the relay causes the first slave power outlet to switch to an on state so that a second external device set to an on state and electrically coupled to the first slave power outlet is placed in a fully operational state at the same time the first external device is placed in a fully operational state, and the relay causes the second slave power outlet to switch to an off state so that a third external device set to an on state and electrically coupled to the second slave power outlet cannot draw current from the power plug at the same time the first external device is placed in a fully operational state thereby preventing the first, second, and third external devices from operating at the same time to cause overloading of an electrical system to which the power plug is electrically connected, and
wherein the third slave power outlet is maintained in an on state whether or not the first external device connected to the master power outlet draws current greater than a predetermined current through the relay from the power plug.

2. The power strip device of claim 1, wherein the relay is an electromechanical relay device.

3. The power strip device of claim 1, wherein the relay is an optical relay device.

4. The power strip device of claim 1, wherein the relay is a solid-state relay device.

5. The power strip device of claim 1, wherein the relay is a reed switch device.

6. The power strip device of claim 1, wherein the relay has a maximum rating of 25 amperes at 120 volts A.C.

7. The power strip device of claim 1, wherein the switch is a single-pull double-throw (SPDT) switch.

8. The power strip device of claim 7, wherein the SPDT switch has a maximum rating of 25 amperes at 120 volts A.C.

9. The power strip device of claim 1, further comprising a body including a first side and a second side different from the first side,
wherein the master power outlet and the plurality of slave power outlets are disposed side by side on the first side; and
wherein the power plug is disposed on the second side.

10. The power strip device of claim 9, wherein the body further includes a third side, and
wherein the power strip device further comprises a plurality of diode lights disposed on the third side.

11. The power strip device of claim 10, wherein the plurality of diode lights have different colors; and
wherein each of the plurality of diode lights are configured to switch between a solid display state and a flashing display state.

12. The power strip device of claim 9, further comprising at least two removable metal brackets disposed on the body.

13. The power strip device of claim 1, wherein, when the first external device connected to the master power outlet draws current less than a predetermined current through the relay from the power plug, the relay causes the first slave power outlet to switch to an off state and the second slave power outlet to switch to an on state.

14. The power strip device of claim 9, wherein the first side is perpendicular to or substantially perpendicular to the second side.

15. The power strip device of claim 1, wherein the first external device is an electrical saw, the second external device is an electric vacuum cleaner, and the third external device is an air compressor.

16. The power strip device of claim 1, wherein the first external device is a microwave oven, the second external device is a buzzer or night-light, and the third external device is a refrigerator.

17. The power strip device of claim 1, wherein the first external device is a television and the third external device is an air conditioner.

18. The power strip device of claim 1, wherein the first external device is a humidifier and the third external device is a heater.

19. The power strip device of claim 1, wherein the first external device is a potable water pump and the third external device is a sump pump.

20. The power strip device of claim 1, wherein the first external device is a sump pump, the second external device is an alarm, and the third external device is a potable water pump.

\* \* \* \* \*